(No Model.)

W. C. PURSELL.
AXLE SKEIN.

No. 367,764. Patented Aug. 2, 1887.

WITNESSES
Villette Anderson.
Philip C. Masi.

INVENTOR
William C. Pursell.
by E. W. Anderson
his Attorney

United States Patent Office.

WILLIAM C. PURSELL, OF SOMERVILLE, INDIANA, ASSIGNOR OF ONE-HALF TO JAMES H. JONES, OF SAME PLACE.

AXLE-SKEIN.

SPECIFICATION forming part of Letters Patent No. 367,764, dated August 2, 1887.

Application filed April 5, 1887. Serial No. 233,752. (No model.)

*To all whom it may concern:*

Be it known that I, WILLIAM C. PURSELL, a citizen of the United States, resident at Somerville, in the county of Gibson and State of Indiana, have invented certain new and useful Improvements in Axles and Spindles; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
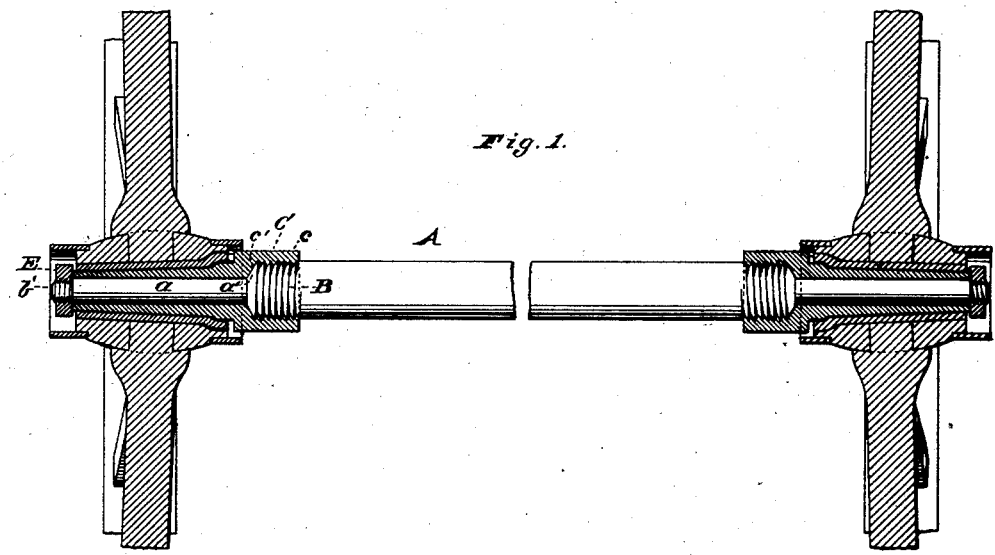
Figure 2:
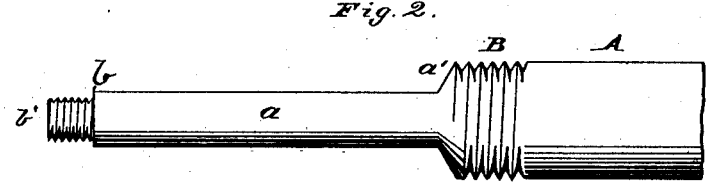
Figure 3:
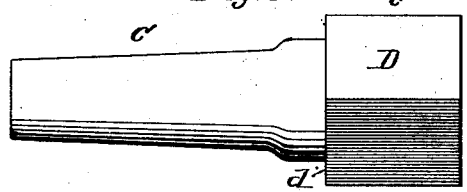

Figure 1 of the drawings is a representation of this invention and is a vertical longitudinal section. Fig. 2 is a detail and a side view of the end of the axle. Fig. 3 is a side view of the sleeve-journal.

The invention relates to improvements in the axles of such vehicles as wagons, carriages, and buggies, and refers especially to the journals thereof, the object being to lengthen the life of the axle and avoid blacksmith's work in repairing the same.

The invention consists in the construction and novel arrangements of the detachable journals for an axle and the combination of the axle and journals, as hereinafter described, illustrated in the drawings, and pointed out in the appended claim.

In the accompanying drawings, A designates the end portion of an axle of a vehicle— such as a buggy—having the cylindrical core portion $a$ separate from the main part of the axle by the circumferential shoulder $a'$. The axle, inward from said shoulder, is threaded at B, and the end of the cylindrical journal portion $a$ is provided with a rectangular circumferential shoulder, $b$, outside of which there is a tapped portion, $b'$, threaded in the same direction as the part B, both of which threads must run inward on the axle.

C is a sleeve-journal provided with the enlarged portion $c$, internally threaded to engage the threaded portion B of the axle, and provided with the internal circumferential shoulder, $c'$, to abut and fit against the shoulder $a'$. The sleeve-journal outward from the shoulder $c'$ is cylindically bored to fit snugly upon the core portion of the axle and end flush with the shoulder $b$ thereon. The outer surface of the said sleeve-journal is tapered from the shoulder to the end in the usual way.

D is an enlargement of the said sleeve-journal adjacent to the external shoulder, $d$, made by the enlarged portion $c$ of the same, which enlargement is made angular, so that the sleeve journal may be screwed in place by a suitable wrench.

E is a nut screwing on the tapped end $b$ of the axle to secure the wheel in position. As the threads must run inward on the axle, it follows that the tapped parts at one end of the axle are threaded to the right and those of the other to the left. This follows from the fact that the wheels at both ends rotate in the same direction, and by this construction the friction of the hubs will tend to keep the journals tight on the axles.

When the sleeve-journal becomes worn, a new one is substituted therefor, and can be put in position quickly and easily, thus saving the work of a blacksmith in welding on a new journal and also saving time. The sleeve-journal also prevents the fracture of the journal portion of the axle, which does not wear, as the sleeve-journal does not turn thereon, so that the only wear is on the detachable part, which can easily be removed and a new one substituted.

The wrench-seat on the sleeve-journal enables the operator to turn it home with ease or to remove it when required. Should the sleeve not be turned fully home, it will have nevertheless a solid connection with the spindle-core $a$, because of the cylindrical form of the latter and of the corresponding bore of the sleeve-journal.

Having described this invention, what I claim, and desire to secure by Letters Patent, is—

The combination, with the axle A, having the shoulders $a'$ $b$, the cylindrical core portion $a$, and the threaded parts B $b'$, of the conical sleeve-journal C, having a cylindrical bore, the internally-threaded enlarged portion $c$, and the exterior angular wrench-seat portion, D, substantially as specified.

In testimony whereof I affix my signature in presence of two witnesses.

WILLIAM C. PURSELL.

Witnesses:
A. L. STUART,
SAMUEL C. BARRETT.